Figure 1:
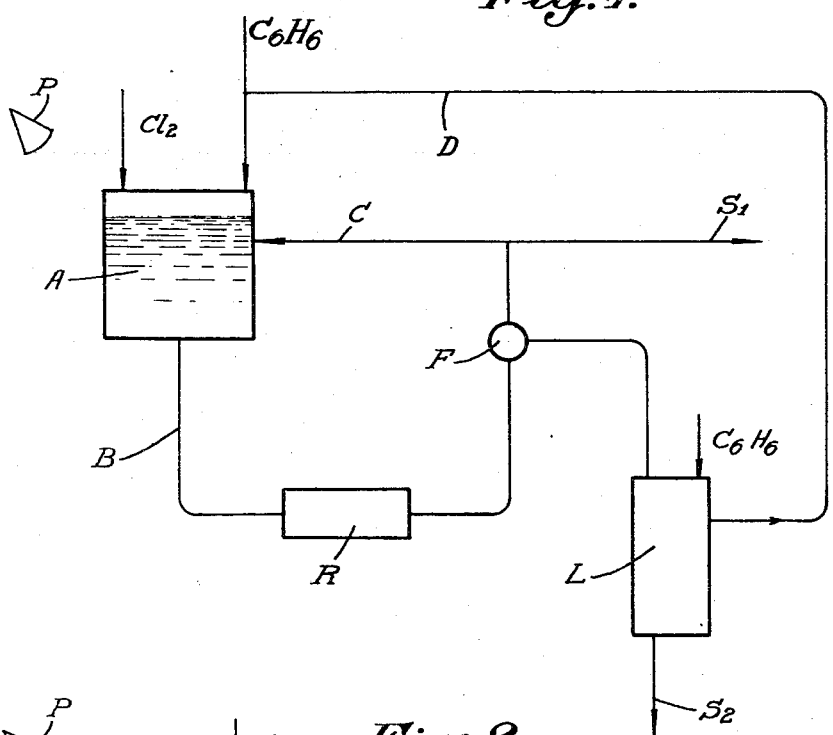

Nov. 14, 1950 — M. GONZE — 2,529,803

PHOTOCHEMICAL PREPARATION OF γ BENZENE HEXACHLORIDE

Filed Aug. 23, 1946

Inventor
M. Gonze
By Glascock Downing Seebold
Attys

Patented Nov. 14, 1950

2,529,80

UNITED STATES PATENT OFFICE 2,529,803

PHOTOCHEMICAL PREPARATION OF γ BENZENE HEXACHLORIDE

Max Gonze, Forest-Brussels, Belgium, assignor to "Solvay & Cie," Brussels, Belgium, a Belgian Company Application August 23, 1946, Serial No. 692,722
In Belgium September 24, 1945

8 Claims. (Cl. 204—163)

It is known that both the α and the β isomers of benzene hexachloride can be obtained by causing a current of chlorine gas to bubble through benzene under sun light. Moreover, by operating in presence of a dilute solution of caustic soda Vanderlinden, (Bericht 1912) was able to isolate next to the α and β isomers two new isomers of benzene hexachloride melting at 112° C. and 129° C. respectively, which isomers were named γ and δ respectively.

More recently the Great Western Electrochemical Company (U. S. Patent No. 2,010,841) was able to obtain a mixture of the four isomers by introducing benzene into liquid chlorine in the absence of light and of a catalyst. Lastly Société Progil (Belgian Patents No. 456,066 and 456,561) has obtained in divided form benzene hexachloride of relatively low melting point (120°) and relatively soluble in benzene, by chlorinating benzene either in presence of a catalyst which does not convey chlorine, such as mercury, or in presence of an oxidising catalyst (nitrogen oxide) or again in presence of water or of a concentrated saline solution.

It is known, furthermore, that the four isomers mentioned above are not the only possible ones, since in theory there may be foreseen eight stereoisomers of benzene hexachloride.

The object of the present invention is to produce a solution of benzene hexachloride rich in isomers other than α and β. It is based on observation of the fact that the α and β isomers are less soluble in benzene than the others and, in accordance with this invention, advantage is taken of that property by carrying out the chlorination under such conditions that crystals of the α and β isomers are separated from the solution, preferably as soon as they are formed, so that the chlorination can be continued until the solution is practically saturated with γ isomer.

The reaction is effected at atmospheric temperature in an enclosure lighted with artificial light and the chlorination is interrupted only when the benzenic solution of benzene hexachloride is saturated or practically saturated with γ isomer so that a solution is obtained that is very rich in isomers other than α and β.

I have ascertained the surprising fact that after evaporating that solution the resulting solid product has a melting point of the order of 70° C., which temperature is considerably lower tha that of the compounds or mixtures obtain hitherto (above 112° C.) and furthermore tl said product is very soluble in the usual solvent The crystals of the α and β isomers separate in the course of chlorination are washed wit benzene in order to recover the impregnatir mother liquor and the liquor washed away, aft having been enriched with benzene if desired, used as starting material for a fresh chlorin tion.

Further features of the invention relate to tl steps for conveniently carrying out the abo process. Thus, in order to attain easily the sa uration with γ isomer it is advisable to reduc or better to avoid, the formation of crystals of tl α and β isomers within the chlorination vat. 7 this end, an advantageous method consists continuously drawing off the reacting solutio cooling it to cause the α and β isomers to crysta lize, separating said isomers by centrifuging or l any other known process and then reintroducir into the chlorination vat the solution freed fro crystals. This method of operation has the a vantage of avoiding stoppages in the chlorine fee pipe, of maintaining efficacious lighting of tl solution, which would not be the case if the s( lution held many crystals in suspension, and facilitating adjustment of the temperature l avoiding the formation of crusts which wou form a heat-insulating layer on the wall of tl receptacle.

Figure 2:
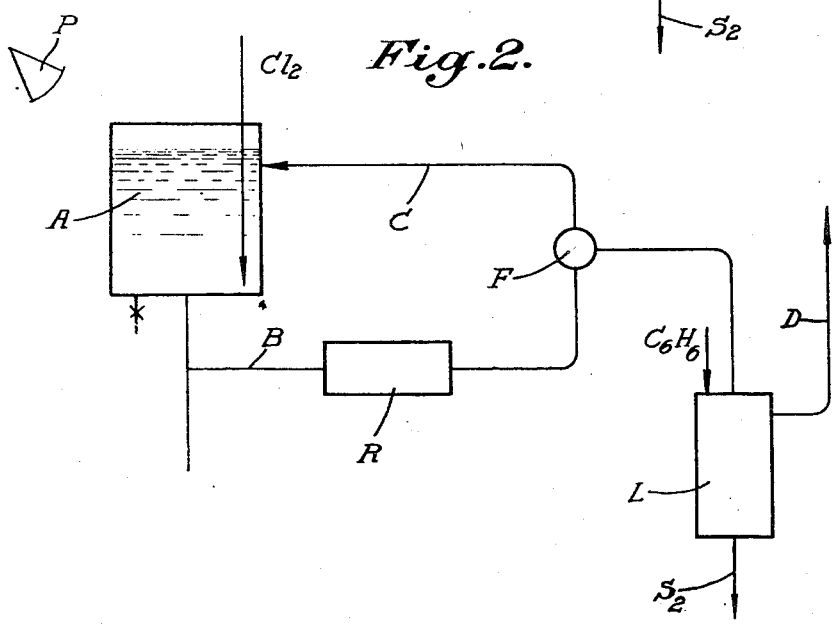

Figs. 1 and 2 of the drawing illustrate diagran matically, by way of example, arrangements apparatus which are suitable respectively for tl continuous and the discontinuous operation the process according to this invention.

For continuous operation, into the chlorinatic receptacle A containing a solution at a concer tration corresponding to saturation with each the isomers α, β and γ at the temperature of tl crystallizer, I introduce benzene and chlorine such proportions that the solution remains pra tically saturated with isomer γ at the temper ture considered. At B I continuously withdra a fraction of the saturated solution which cooled in a crystallizer R, the crystals formed a filtered in a suitable apparatus F and a portic of the solution is reintroduced at C into the chl rination vat, while another portion leaves tl cycle at $S_1$ as finished product. The crystals withdrawn at F are washed with benzene in a scrubbing tower L and the resulting solution is reintroduced at D into the chlorination vat A. In order to keep the process continuous, it suffices to withdraw at $S_1$ and $S_2$ quantities of benzenic solution and of crystals corresponding to the amounts of raw products used.

The benzenic solution rich in isomers other than $\alpha$ and $\beta$ which is obtained by the process according to this invention may be used such as it is, or in emulsion form, as an insecticide. It may also be subjected to evaporation with water vapour or to any other suitable treatment in order to separate therefrom the benzene, the chlorobenzenes (i. e. substitution products which are not combined with the chlorine by addition in the chlorination vat) and a mixture of benzene hexachlorides of very low melting point (under 70° C.) very soluble in the usual solvents.

In that case the benzene is sent back to the chlorination step and the crystalline product is used as an insecticide, either as it is, or in admixture with diluents.

Example (Fig. 2)

I introduce 1 kg. of benzene into a receptacle A lighted by an electric lamp P and cause chlorine gas to bubble therein until the total quantity introduced is of the order of 1 kg. During this operation the solution is kept at a temperature of about 25° C. by a current of cold water. A portion of the reacting solution is continuously withdrawn and cooled in a crystallizer R. When 150 to 200 gr. of chlorine gas have been introduced, the presence of crystals is seen in the filter F.

When all the chlorine has been fed the solution is practically saturated with $\gamma$. Chlorination then is stopped. About 700 gr. of a benzenic solution containing 400 to 450 gr. of benzene hexachloride per kg. is obtained. After elimination of the benzene and chlorobenzenes by evaporation with water vapour, the remaining solid product has a melting point of the order of 70° C.

Meanwhile there has been withdrawn from the filter F in the course of chlorination 1300 gr. of a crystalline mass impregnated with mother liquor, which mass being washed with benzene in L and dried, gives about 900 gr. of a product melting at 150° C. and formed chiefly of $\alpha$ benzene hexachloride. The benzenic solution which has served for washing the precipitate is collected at D and used as starting material for further chlorination.

I claim:

1. A process of producing a concentrated solution of $\gamma$ benzene hexachloride in benzene, comprising introducing into a vat containing benzene a quantity of chlorine gas sufficient to obtain a solution approximately saturated with $\gamma$ isomer, the reaction being carried out under the influence of light, continuously circulating the reacting liquid from said vat to a crystallizer and back into said vat, cooling the liquid in said crystallizer, separating the crystals of the $\alpha$ and $\beta$ isomers in said crystallizer, washing said crystals with fresh benzene, and using the washing solution as starting material for further chlorination, the liquid at the end of the chlorination comprising a concentrated solution approximately saturated with $\gamma$ isomer.

2. A process of producing a concentrated solution of $\gamma$ benzene hexachloride in benzene, comprising reacting chlorine gas with benzene under the influence of light, forming a benzenic solution of benzene hexachloride isomers at a concentration corresponding to saturation with $\alpha$ and $\beta$ isomers at the temperature of reaction, cooling said solution thereby causing crystals of the $\alpha$ and $\beta$ isomers to precipitate, separating said crystals from said solution, raising the temperature of the resulting solution and proceeding with the chlorination thereof until a high concentration in $\gamma$ isomer is reached.

3. A process of producing a concentrated solution of $\gamma$ benzene hexachloride in benzene, comprising reacting chlorine gas with benzene under the influence of light, forming a clear benzenic solution of benzene hexachloride isomers at a concentration corresponding to saturation with $\alpha$ and $\beta$ isomers at the temperature of reaction, cooling said solution thereby causing crystals of the $\alpha$ and $\beta$ isomers to precipitate, separating said crystals from said solution, raising the temperature of the resulting solution and submitting said resulting solution to further chlorination and repeating these operations until a solution approximately saturated with $\gamma$ isomer is reached.

4. A process of producing a concentrated solution of $\gamma$ benzene hexachloride in benzene, comprising reacting chlorine gas with benzene in a chamber under the influence of light, causing the resulting solution to circulate out of and into said chamber, controlling temperature conditions inside and outside of said chamber to cause crystals of the $\alpha$ and $\beta$ isomers of benzene to precipitate outside of said chamber, separating said crystals outside of said chamber, proceeding with the chlorination in said chamber until the circulating solution is approximately saturated with $\gamma$ isomer and withdrawing at least a part of the solution approximately saturated with $\gamma$ isomer.

5. In a process of producing a concentrated solution of $\gamma$ benzene hexachloride in benzene as claimed in claim 4, washing the crystals of the $\alpha$ and $\beta$ isomers with benzene and feeding the washing solution to said chamber.

6. A process of producing a concentrated solution of $\gamma$ benzene hexachloride comprising gradually introducing into a reactor both benzene and a quantity of chlorine gas sufficient to obtain a solution approximately saturated with $\gamma$ isomer, carrying out the chlorination in said reactor under the influence of light, continuously circulating the reacting liquid from said reactor to a crystallizer and back into said reactor, keeping said crystallizer at a temperature below the temperature in said reactor, thereby causing crystals of the $\alpha$ and $\beta$ isomers to precipitate, separating said crystals from the circulating liquid, washing said crystals with fresh benzene, introducing the washing solution into the reactor so that it forms at least part of the benzene required for chlorination, controlling the chlorination so that the circulating liquid remains saturated with each of the $\alpha$, $\beta$ and $\gamma$ isomers at the temperature of the crystallizer, and continuously withdrawing a portion of the circulating liquid at a rate corresponding to the rate of chlorination.

7. A method of forming and separating a concentration of $\gamma$ benzene hexachloride isomer comprising chlorinating benzene in a reactor under the influence of light to effect substantial chlorination thereof, continuously withdrawing from the reactor a portion of the benzene hexachloride solution in benzene at a rate substantially corresponding to the rate of chlorination and cooling the solution in a crystallizer whereby crystals of alpha and beta isomers separate, recycling the mother liquor from the crystallizer to the reactor continuously until the mother liquor is approximately saturated with the gamma isomer, withdrawing a portion of the gamma saturated mother liquor from the system and replacing the same with unreacted benzene and recycling the diluted mother liquor to the reactor.

8. The method as defined in claim 7 wherein the separated crystals are washed with benzene and the wash liquor thereof is used as a source of supply of unreacted benzene to the reactor.

MAX GONZE.

REFERENCES CITED

The following references are of record in the file of this patent:

UNITED STATES PATENTS

| Number | Name | Date |
|---|---|---|
| 2,218,148 | Hardie | Oct. 15, 1940 |
| 2,438,900 | Cooke et al. | Apr. 6, 1948 |

FOREIGN PATENTS

| Number | Country | Date |
|---|---|---|
| 504,569 | Great Britain | Apr. 26, 1939 |
| 573,689 | Great Britain | Dec. 3, 1945 |

OTHER REFERENCES

Van der Linden, Berichte der deutsche chemische Gesellschaft, vol. 45 (1912), pp. 231–238.

Slade, Chemistry and Industry, Oct. 13, 1945, pp. 314–319.